(12) United States Patent
Richter et al.

(10) Patent No.: US 9,796,085 B2
(45) Date of Patent: Oct. 24, 2017

(54) MOBILE DEVICE FOR MANIPULATING OBJECTS

(71) Applicant: Handhabungs-, Automatisierungs- und Praezisionstechnik GmbH, Dresden (DE)

(72) Inventors: Stefan Richter, Dresden (DE); Carsten Grunert, Dresden (DE); Steffen Pollack, Dresden (DE); Sven Schirmer, Pirna (DE); Siegfried Ickert, Dresden (DE); Wilfried Krause, Pirna (DE)

(73) Assignee: HANDHABUNGS-, AUTOMATISIERUNGS- UND PRAEZISIONSTECHNIK GMBH, Dresden (DE)

( * ) Notice: Subject to any disclaimer, the term of this patent is extended or adjusted under 35 U.S.C. 154(b) by 50 days.

(21) Appl. No.: 14/837,046

(22) Filed: Aug. 27, 2015

(65) Prior Publication Data
US 2016/0059411 A1    Mar. 3, 2016

(30) Foreign Application Priority Data
Aug. 29, 2014    (DE) .................... 10 2014 217 352

(51) Int. Cl.
*B25J 5/00*         (2006.01)
*B25J 9/16*         (2006.01)
(Continued)

(52) U.S. Cl.
CPC ............. *B25J 9/162* (2013.01); *B25J 5/007* (2013.01); *B25J 9/1666* (2013.01); *B25J 19/005* (2013.01);
(Continued)

(58) Field of Classification Search
CPC . B25J 9/162; G05D 2201/0216; Y10S 901/01
See application file for complete search history.

(56) References Cited

U.S. PATENT DOCUMENTS

| | | | |
|---|---|---|---|
| 2008/0223630 A1* | 9/2008 | Couture | B25J 5/005 180/9.32 |
| 2012/0185096 A1* | 7/2012 | Rosenstein | B25J 11/009 700/259 |
| 2016/0091899 A1* | 3/2016 | Aldred | G05D 1/0225 701/23 |

FOREIGN PATENT DOCUMENTS

| | | |
|---|---|---|
| DE | 102010007591 A1 | 8/2011 |
| DE | 102010046327 A1 | 3/2012 |
| DE | 102012009465 A1 | 11/2012 |

OTHER PUBLICATIONS www.neobotix-roboter.deomnidrektionaler-roboter-mpo-700.html, May 22, 2015.

* cited by examiner

*Primary Examiner* — Dale Moyer
(74) *Attorney, Agent, or Firm* — Jacobson Holman, PLLC.

(57) ABSTRACT

An apparatus for manipulating articles in which a multiaxial industrial robot is arranged on a travel unit and the industrial robot and the travel unit can be supplied with electrical energy via an energy storage unit. The travel unit has a control unit and at least three wheels having at least one drive unit, with the control unit being configured to rotate at least one of the wheels by the drive unit about an axis of rotation standing perpendicular on a symmetrical axis of rotation of the wheel and to rotate it about the symmetrical axis of rotation by the respective drive unit so that the apparatus can be moved in any direction by the travel unit. In addition, area monitoring sensors are arranged on at least two sides of the travel unit to monitor a virtual surface located at a predefined spacing next to and not intersecting the travel unit.

13 Claims, 3 Drawing Sheets

Figure 1:
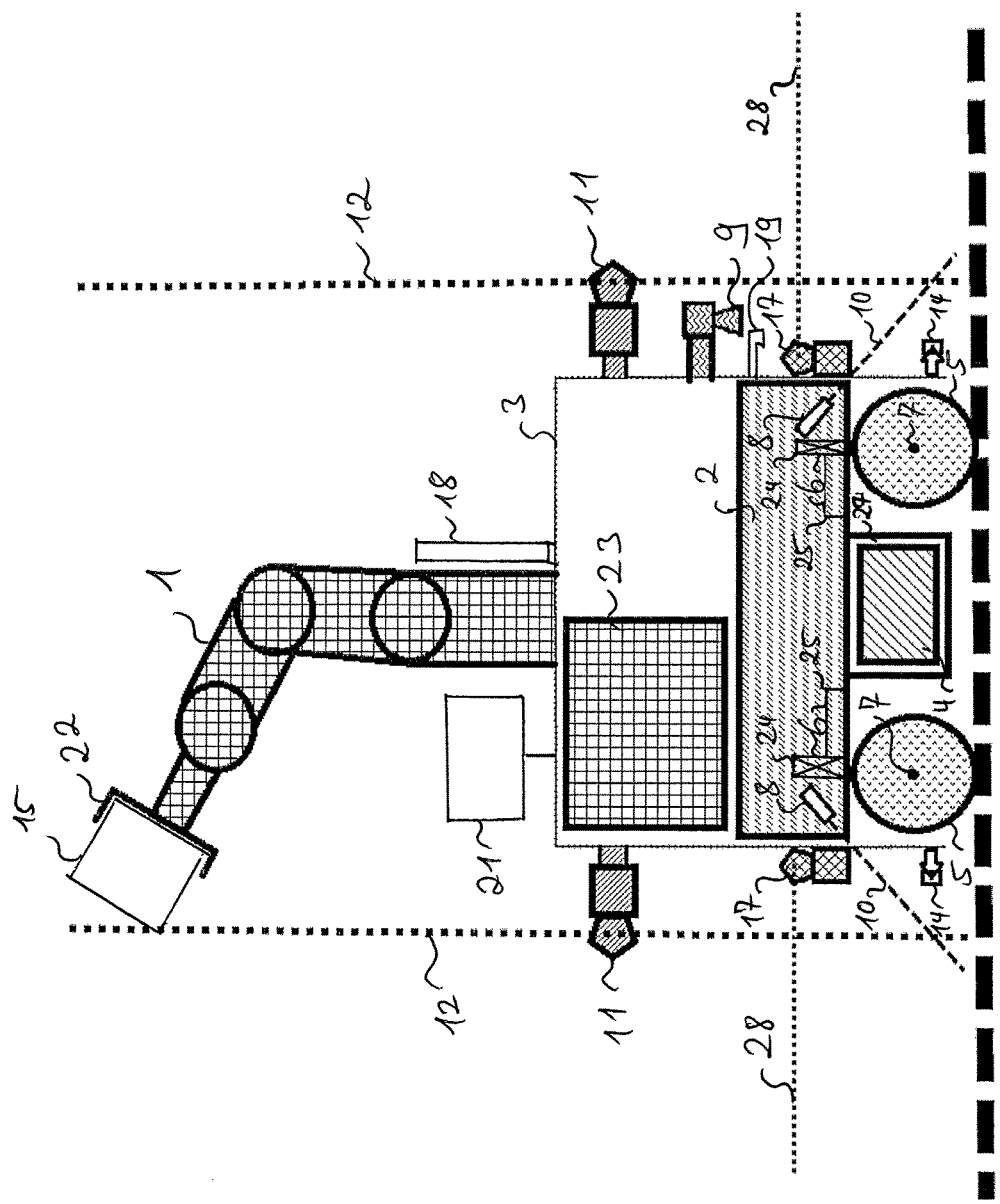

(51) Int. Cl.
*B25J 19/02* (2006.01)
*B25J 19/00* (2006.01)
*B25J 19/06* (2006.01)
*G05D 1/02* (2006.01)
*G05D 1/00* (2006.01)

(52) U.S. Cl.
CPC ........... *B25J 19/022* (2013.01); *B25J 19/027* (2013.01); *B25J 19/063* (2013.01); *G05D 1/024* (2013.01); *G05D 1/0236* (2013.01); *G05D 2201/0216* (2013.01); *Y10S 901/01* (2013.01)

MOBILE DEVICE FOR MANIPULATING OBJECTS

The present invention relates to a travelable apparatus for manipulating articles in which a multiaxial industrial robot is arranged on a travel unit and the industrial robot and the travel unit can be supplied with electrical energy via an energy storage unit.

A rail-mounted apparatus is already known from the prior art for transporting semiconductor substrates and is also described in the document DE 10 2012 009 465 A1. The device described herein is, however, restricted to linear plant arrangements which are only present with restrictions in factories.

It is therefore the underlying object of the present invention to provide an apparatus with which articles can be transported fast, reliably and in an automated manner without a restriction of a travel zone.

This object is achieved in accordance with the invention by an apparatus in accordance with claim 1. Advantageous embodiments and further developments are described in the dependent claims.

An apparatus for the manipulation of articles in which a multiaxial industrial robot is arranged on a travel unit has an energy storage unit via which the industrial robot and the travel unit can be supplied with electrical energy. The travel unit moreover has a control unit and at least three wheels with at least one drive unit. The control unit is configured to rotate at least one of the wheels by the drive unit about an axis rotation standing perpendicular on a symmetrical axis of rotation of the wheel and to rotate it about the symmetrical axis of rotation by the respective drive unit. The apparatus can hereby be traveled wirelessly in any direction by the travel unit. In addition a respective area monitoring sensor is arranged at at least two sides of the travel unit. Each of the area monitoring sensors is configured to monitor an area located at a predefined spacing next to the travel unit with respect to an intrusion of persons or articles.

Since the three wheels are rotatably supported about their symmetrical axis of rotation at the travel unit, the total apparatus can be moved simply on a floor on a rotation of the wheels about their centrally arranged symmetrical axis of rotation. Since only one single drive unit drives one of the at least three wheels, a weight of the apparatus is kept small and the apparatus can nevertheless be moved as desired on the floor. Since the energy storage unit and the control unit are arranged in the apparatus itself, no cables restricting a freedom of movement have to be moved along for the energy supply or for the transmission of control commands. A typically planar virtual area is monitored by the area monitoring sensors to detect an intervention of persons into a work zone of the industrial robot and to protect the apparatus against damage by shutting down. A floor on which the travel unit is moved can equally be monitored with respect to irregularities or holes by the spacing of the virtual area from the travel unit and its arrangement next to the travel unit, i.e. without the virtual area intersecting the travel unit. The virtual area is invisible to a person.

All the wheels are typically rotatable about their axis of rotation. The direction can be freely selected by the rotation of the wheels about the axis of rotation and the apparatus can be traveled as desired in a translatory movement in two dimensions. A rotational movement is additionally possible by the rotation about the axis of rotation by which the direction can simply be changed so that an omnidirectional undercarriage is present.

The travel unit preferably has four wheels since the movement of the apparatus can hereby be controlled more exactly and an omnidirectional undercarriage is present with which the apparatus can also turn on the spot.

Provision can also be made that each of the wheels is driven via a drive unit to control the movement more reliably and to execute it faster. Four wheels with a respective drive unit are thus attached to the travel unit.

The wheels can be formed from wear-resistant polyurethane, preferably a polyester urethane rubber, and/or a stainless metal or a stainless metal alloy, in order to release as few particles as possible on a movement and thus also be able to be used in clean rooms.

The drive unit or the drive units typically has or have a first motor for rotating the (respective) wheel about the symmetrical axis of rotation of the wheel and has or have a second motor for rotating the (respective) wheel about the axis of rotation. The first motor thus serves a driving of the wheel, while the second motor serves a steering of the wheel. Both functions can be performed more exactly by two motors.

The first and/or the second motor is/are preferably an electric motor since hereby a simple control of the one wheel or of the wheels is given.

The area monitoring sensors are typically formed as laser scanners to reliably scan the monitoring zone. Laser scanners comprise a scan head and control electronics. A laser beam is generated in the scan head and is deflected by a rotating mirror moved by the control electronics or by a mirror prism such that the laser sweeps over a planar (virtual) area in space which is hereby monitored. If an article is registered in the swept-over area which impedes a free propagation of the laser beam, this is passed on to the control unit which is configured to shut down the apparatus to avoid damage. A respective area monitoring sensor is preferably arranged at each side of the travel unit so that the industrial robot is surrounded by monitored areas and an intervention into a work zone of the industrial robot can be detected. If the industrial robot is intended to engage out of the work zone, the control unit is configured to deactivate the corresponding one of the area monitoring sensors at times.

The area monitored by the area monitoring sensors typically ends at the floor and can be inclined by up to 10° with respect to the axis of rotation. The areas are, however, preferably aligned in parallel with the axis of rotation of the wheel. That is they extend vertically. A contour recognition of the floor with respect to irregularities or holes can hereby take place.

The area monitoring sensors are preferably arranged at opposite sides of the travel unit in order to carry out a monitoring in different directions of travel.

An identification unit can be provided at the travel unit for identifying the apparatus and or further articles present in the environment of the apparatus. An interaction is hereby secured between the apparatus and further articles, for example substrate holders or charging stations. The identification unit is preferably formed as an electromagnetic sensor, typically as an optical sensor, and can thus likewise be used in clean rooms. The identification unit is particularly preferably configured to recognize reference marks in a non-contact manner and thus to facilitate an orientation via the reference marks.

A video camera with an image processing unit can be used as the optical sensor. Quick-response codes (QR codes) or barcodes can be used as reference marks. It is, however, also possible to transmit identification codes by means of electromagnetic radiation, for example in an optical manner or by means of wireless local area networks (WLAN).

At least two space monitoring sensors can be arranged at the travel unit which generally monitor a virtual area lying in parallel with the floor on which the travel unit moves with respect to an appearance of persons, articles or obstacles. It serves a collision protection of the apparatus and a navigation in that the apparatus or the travel unit generates a "map" around itself with the aid of the space monitoring sensors, the map preferably immediately stopping all movements when an intrusion is detected by the control unit. These space monitoring sensors are typically arranged at a height between 17.5 cm and 18 cm above the floor to detect a person lying on the floor in every case.

Alternatively or additionally, at least two floor monitoring sensors can be arranged at the travel unit which monitor a floor on which the travel unit moves by monitoring a floor contour with respect to obstacles or holes. It is possible by the free movement of the apparatus that the apparatus has problems with floor irregularities. It is possible by the monitoring of the floor contour to detect these floor irregularities and to evade these floor irregularities by the control unit. It is thus also prevented, for example, that the apparatus falls into a hole in the floor.

The floor monitoring units are preferably arranged at the travel unit such that a region of 120° in front of each of the wheels is monitored to achieve a monitoring of the surrounding floor which is as complete as possible.

The floor monitoring sensors are typically laser distance sensors which can reliably detect bumps or depressions in the floor via a distance measurement.

Protective rails having a contact sensor can be provided at at least two sides of the travel unit. These protective rails serve a collision protection. The contact sensors are connected to the control unit. The control unit is configured to shut down the apparatus on a contact registered by one of the contact sensors. The protective rails are typically composed of an elastomer. Protective rails are preferably arranged at all sides of the travel unit. The lower side of the protective rails can in this respect be at the same level as a lower margin of the wheels in order also to detect flat articles lying on the floor and to avoid a collision of the apparatus with them.

Provision can be made that the energy storage unit is formed for inductive charging. This allows a use of the apparatus in clean rooms. Induction loops are preferably provided in the floor for this purpose on which the apparatus moves and the apparatus itself likewise has an induction loop arranged at the travel unit.

The industrial robot typically has a gripping apparatus at an end opposite the travel unit for gripping and holding articles. The industrial robot is preferably likewise controllable by the control unit for this purpose and can grip articles and put them down again after the moving of the apparatus.

The control unit can be formed to determine whether the apparatus has an exact position determined via the reference marks and the identification unit before a desired plant and has additionally reached a desired position via a measurement of covered path distances. Only when it has been verified by this information that the apparatus is in a correct position can the control unit instigate further steps such as a carrying out of charging or a picking of wafers, cassettes, masks or similar.

The energy storage unit is typically protected from mechanical damage by a hermetically sealed housing that is in particular an airtight and gas-tight housing. The hermetically sealed housing which can be composed of an electrically insulating material at at least an outer side remote from the energy storage unit in this respect also serves to seal the energy storage unit with respect to an outside space and to prevent an escape of substances into the outside space. Only passages for electrical lines can be provided in the housing.

The energy storage unit preferably has a lithium iron phosphate battery (LFP battery) or a lithium titanate battery which can be used in clean rooms.

Alternatively or additionally, a temperature sensor, a pressure sensor and/or an aerosol monitoring sensor is arranged at the energy storage unit which monitor the energy storage unit and are connected to the control unit. If a temperature, a pressure or an aerosol quantity in the energy storage unit reaches a predefined limit value, the control unit is configured to emit a warning signal and to shut down the apparatus or to automatically leave dangerous zones and subsequently to reliably deactivate the apparatus to avoid damaging effects of the energy storage unit on the outside space.

To ensure increased safety, one or more contact sensors can be present at a frame of the travel unit and an impacting of the moving apparatus on an article or a person is detected by them.

The control unit can be directly programmed or can have a communication unit via which control commands can be externally transmitted to the control unit in a wireless manner. This allows a simple and fast control. An input device for control commands, an electronic interface for data entry and an output unit having acoustic and/or optical display elements can also be present for the direct programming.

A system for the intermediate storage of articles, typically semiconductor substrates, can be provided on the apparatus. The system is arranged at the travel unit and/or at the industrial robot.

The invention will be explained in more detail by way of example in the following.

Figure 2:
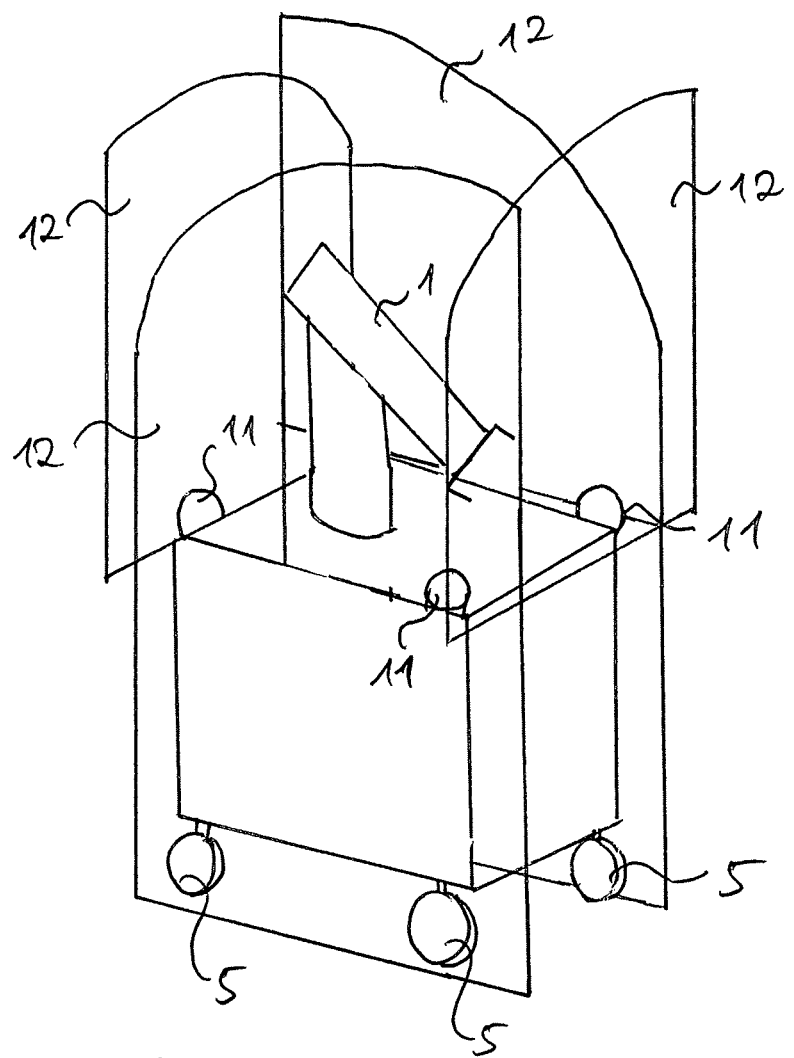

There are shown:

FIG. 1 a schematic side view of an apparatus with an industrial robot and a travel unit;

FIG. 2 a perspective view of the travel nit with monitoring zones drawn in; and

Figure 3:
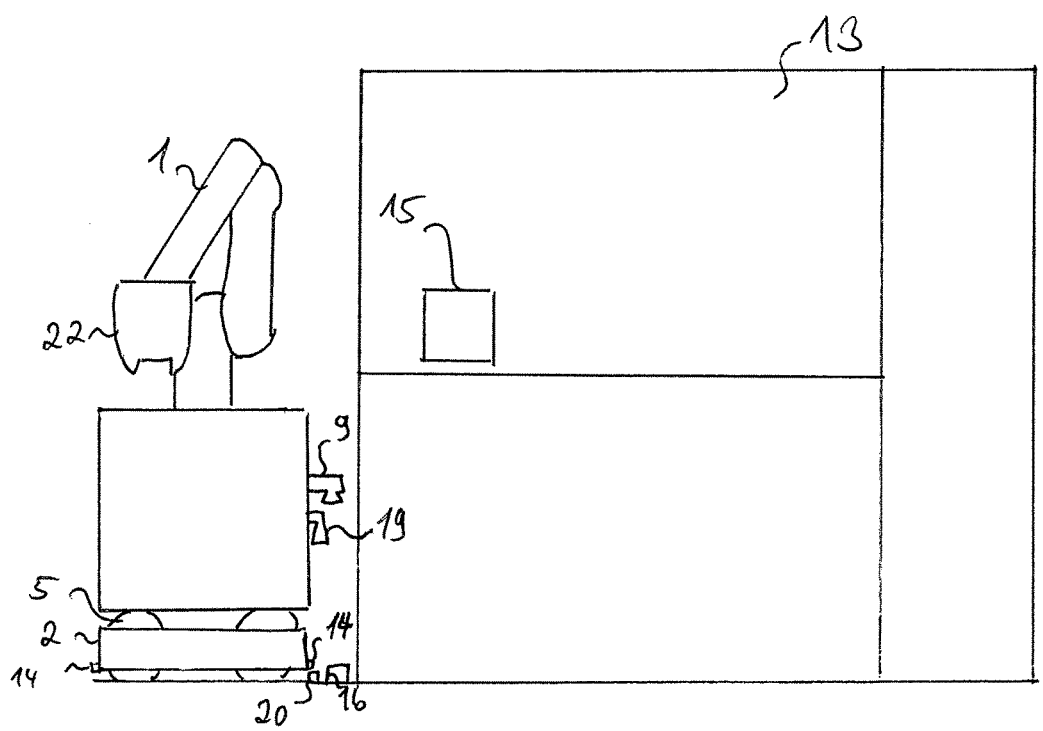

FIG. 3 a side view of the apparatus on a substrate picking from a device with a control unit drawn in.

An apparatus is shown in a schematic side view in FIG. 1 in which an industrial robot 1 having six axes of rotation and thus six degrees of freedom is arranged on a travel unit 2. The industrial robot 1 is mounted on a frame 3 or on a housing. In further embodiments, the industrial robot 1 can also be arranged displaceably on the frame 3.

The travel unit 2 is rectangular in a plan view and has four wheels 5 which have tires composed of a wear-resistant polyurethane in order also to be able to be used in clean rooms. An energy storage unit 4 in the form of an LFP battery enclosed in a hermetically sealed housing 27 is attached to the travel unit 2 between the wheels 5 or seated on the travel unit 2. The housing 27 of the energy storage unit 4 is composed of an electrically insulating material to avoid short-circuits and only has a passage for the electrical contacting of the energy storage unit with the further electrical and electronic parts of the apparatus. The housing 27 of the energy storage unit 4 is otherwise both airtight and gas-tight. A temperature sensor which monitors the temperature of the battery, a pressure sensor which monitors a pressure of the battery and an aerosol sensor which monitors an aerosol concentration with respect to aerosols discharged from the battery are additionally arranged in the housing 27. If a predefined threshold value of the temperature, of the pressure or of the aerosol concentration is reached, a signal is emitted to the control unit 23 and the apparatus is stopped and a warning signal is emitted.

A control unit 23 in the form of a computer which controls at least one of the wheels 5, in the embodiment shown, however, all four wheels 5, is provided in the travel unit 2 or, as shown in FIG. 1, on the travel unit 2. For this purpose, an omni-drive module 6 is arranged at at least one of the wheels 5, in the embodiment shown an omni-drive module 6 is arranged at all four wheels 5, via which the wheels 5 can be rotated freely about an axis of rotation standing perpendicular on a symmetrical axis of rotation 7 to steer the travel unit 2 and via which said wheels can be driven so that they move the travel unit 2. For this purpose, the wheels 5 are rotated about the centrally supported symmetrical axis of rotation 7 on which the wheels 5 are rotatably supported.

In further embodiments, the control unit 23 can also control an additional robot control unit which is likewise arranged on the travel unit 2 and which controls the industrial robot 1.

The control unit 23 is also configured to control the industrial robot 1. Articles can be manipulated and moved in all six degrees of freedom by the industrial robot 1. The omni-drive module 6 or the omni-drive modules 6 have a first motor 24 for rotation about an axis of rotation and thus for steering as well as a second motor 25 for driving the wheels 5. Both motors 24, 25 are designed as electric motors which are supplied with electrical energy from the energy storage unit 4.

The apparatus shown in FIG. 1 can be moved in a translatory manner in any desired directions on a floor by the travel unit 2 and can simultaneously also be rotated by a rotation of the wheels 5 about the axis of rotation standing perpendicular on the symmetrical axis of rotation 7. The travel unit 2 can thus cover straight distances in all directions at different speeds and can turn on the spot. Due to the free movability, the apparatus can travel to different process plants in the clean room, can there pick semiconductor substrates, which are also called wafers, or wafer cassette 15, boxes, individual masks or similar and transport them to a further process plant. The control unit 23 is directly programmed for this purpose, but a user can also reprogram the control unit 23 via an interface. For this purpose, a keypad and a display 18 are arranged at the frame 3 and/or an interface is provided for connecting these devices. In further embodiments, the control unit 23 has a transmission/reception unit by which the control unit 23 and thus the total apparatus can be controlled wirelessly by an external device, for example via radio.

The wheels 5 are arranged at four corners of the travel unit 2 so that a respective two of the wheels are arranged aligned behind one another in a longitudinal direction and in a transverse direction. The omni-drive modules 6 are each mounted centrally above the wheels 5. A control effort to be managed by the control unit 23 is admittedly high due to an active drive and steering of the wheels 5 by the omni-drive modules 6 since the direction and the speed have to be determined for every travel state, but the travel unit 2 has a very high degree of agility, can turn on the spot and can maneuver in any direction. Independently of a preceding travel path, a positioning and repeat accuracy of $\Delta x$, $\Delta y < \pm 5$ mm, $\Delta z < \pm 0.5$ mm, $\Delta Rx$, $\Delta Ry$, $\Delta Rz < \pm 0.5°$ can be achieved and a handling accuracy can be achieved by the sensor system described in the following of $\Delta x$, $\Delta y < \pm 0.5$ mm, $\Delta z < \pm 0.5$ mm and $\Delta Rx$, $\Delta Ry$, $\Delta Rz < \pm 0.5°$. A handling should in this respect be understood as an ability to handle objects in a firm state and a loading and unloading of process plants.

A floor located in front of the apparatus can be monitored via four floor monitoring sensors 8 which are arranged at corners of the travel unit 2 in that a floor contour is checked by a distance measurement using a laser. Irregularities or obstacles on the floor can be recognized by the floor monitoring unit 8 which scans the floor as laser distance sensors in the monitoring zones 10 in a scan zone of at least 2 m. For this purpose, a laser beam is directed obliquely downwardly onto the floor from the floor monitoring sensors 8. The control unit 23 can stop the travel unit 2 in the case of detected obstacles or can evade the obstacles.

The floor monitoring units 8 are arranged above the wheels 5 at a height of 180 mm above the floor in the embodiment shown in FIG. 1 and are arranged such that a floor part located obliquely directly in front of the wheels 5 is monitored. Holes in the floor and in the clean room, e.g. due to a removed floor plate which has not yet been reinserted, can hereby be recognized, for example, and a falling of the apparatus into such a hole is prevented.

In addition, area monitoring sensors 11 are arranged at each corner of the housing and monitor the space surrounding the apparatus as laser scanners, the area monitoring sensors being arranged on a housing beneath which the control unit 23 and the travel unit 2 are arranged. Each of the space monitoring units 11 can also be attached above one of the wheels 5 and one of the floor monitoring units 8 or can be located centrally at one of the four sides of the housing. The four area monitoring sensors 11 can also be arranged in respective pairs aligned opposite one another at the four sides of the travel unit 2. The area monitoring sensors 11 generate a vertical "light curtain" 12 as a virtual area which is periodically swept over by a laser beam. The light curtain is in this respect not visible due to a use of a laser in the infrared or ultraviolet wavelength range; the laser can, however, also emit in the wavelength range between 400 nm and 700 nm, that is, in the visible range of the electromagnetic spectrum.

Each of the virtual surfaces 12 is in this respect vertically aligned and extends next to the travel unit 2 such that the floor is also scanned and holes in the floor can also be detected by the area monitoring sensors. In further embodiments, these virtual surfaces 12 can also be inclined by up to 10° with respect to the vertical or to a normal of the floor, but never intersect the travel unit 2, but are rather always spaced apart from it. A closed light curtain is formed around a working zone of the industrial robot 1 by the virtual areas 12.

If an interruption of the light curtain 12 is registered, for example by an intrusion of a person into a working zone of the industrial robot 1, the control unit 23 is configured to stop the industrial robot 1 and the travel unit 2 immediately and not to carry out any further movements or only to carry out movements at a reduced, safe speed. The apparatus additionally has a warning mechanism which is arranged at the travel unit 2 and which comprises in the embodiment shown a lamp and a loudspeaker by which optical and acoustic warning signals are emitted when one of the monitoring units 8 and 11 detects an irregularity. In further embodiments, however, only an optical warning device or only an acoustic warning device can also be provided.

If the industrial robot is to grip from the light curtain, the control unit 23 can deactivate the corresponding area monitoring sensor 11 for a specific time.

Protective rails 14 of plastic, for example of an elastomer, are moreover attached to the travel unit 2 at the level of the wheels and at least 2 cm above the floor at all four sides to protect the travel unit 2 from mechanical impairment on collisions. The protective rails 14 can also be arranged in further embodiments up to 10 cm above the floor to be able to travel up gradients without scraping. A respective one or more contact sensors are inserted in these rails 14 which transmit a signal to the control unit on contact so that the apparatus is stopped at this registered signal. Very flat articles lying on the floor can hereby be detected and the apparatus does not drive over them. The likewise drawn control unit 23 lies centrally on the travel unit 2.

The industrial robot 1 in the embodiment shown in FIG. 1 has gripped a wafer cassette 15 via a gripper 22 and can in this respect exit the working space defined by the light curtain 12, for which purpose the control unit 23 can temporarily shut down the corresponding surface monitoring sensor 11.

Space monitoring sensors 17, which monitor a virtual area 28 extending in parallel with the floor for obstacles, are now additionally arranged at the travel unit 2 at the corners above the wheels 5 and above the floor monitoring sensors. These sensors 17 are arranged at a height of 18 cm above the floor and should in every case detect a person lying on the floor.

Two reception units 21 are arranged on the apparatus and can each receive two of the wafer cassettes 15 so that a total of four wafer cassettes 15 are transported. Due to an arrangement next to the industrial robot 1, the wafer cassettes 15 are only exposed to minimal acceleration values during a travel of the apparatus due to their slanted position; in addition, they lie ideally in the air flow of a room air-conditioning of the clean room.

A perspective view of the industrial robot is shown with monitored virtual areas 12 in FIG. 2. Repeating elements are provided with identical reference numerals in this Figure and also in the following Figures. In this Figure, lateral monitoring zones of the apparatus are drawn as virtual areas 12 by which safety is ensured for users, machines and transported articles. The light curtain formed by these virtual areas 12 completely surrounds a working zone of the industrial robot 1 and is generated by the four area monitoring sensors 11. The light curtain can in this respect reach down to the floor, even though this is only the case in the embodiment shown in the two area monitoring sensors 11 mounted at the longitudinal axis of the apparatus.

The apparatus is shown in a side view in front of a process plant 13 in FIG. 3. The apparatus moves in a clean room on a floor characterized by floor plates.

The industrial robot 1 removes a wafer cassette 15 from the process plant 13 via the gripper 22, which is arranged at an end of the industrial robot 1 opposite the travel unit 2, in order to transport said wafer cassette to a further process plant. The control unit 23 for this purpose has positioned the apparatus via the travel unit 2 next to the process plant 13 at a spacing of 60 mm.

A video camera 9 is arranged at the travel unit and reference marks, for example QR codes, can be recognized on the floor by it so that a more exact positioning of the apparatus is possible via these reference marks and via an evaluation of the recognized reference marks by the control unit 23. It is thus possible to navigate along fixed path points such as the QR codes or freely in the space between two points with a individual path selection.

A video camera 9 arranged laterally at the apparatus and the control unit 23 check via a QR code 16 affixed to the floor next to the process plant 13 whether the apparatus is standing at the correct distance at the correct process plant 13. The QR code 16 is spaced apart from the process plant 13 by 80 mm for this purpose so that a safety distance is observed between the apparatus and the process plant 13.

The QR code 16 is simultaneously arranged fixed in space with respect to the process plant 13.

In addition, a charge-free contacting of the energy storage unit 4 is provided in which an electric current flow and/or an application of an electric voltage can only take place when a position of the travel unit 2 has been reliably determined. Induction coils are arranged in the floor for charging and an induction coil is likewise located in the hermetically sealed housing in which the energy storage unit 4 is arranged.

To ensure a picking of wafer cassettes 15 only on a secure standing, the control unit 23 is configured to check whether the correct position was traveled to via the image recognition of the video camera 9. In addition, it is checked via an optical interface 19 at the travel unit 2 and its counter-piece 20 at the process plant 13 via an infrared signal that the correct position in front of the desired process plant 13 was actually adopted. Due to a restricted range of the optical interface 19 and 20 and a spatial restriction resulting from this, the plants cannot be confused. In further embodiments, another interface with a spatially restricted range, typically less than 15 cm, can also be used instead of an optical interface; for example, an electromagnetic sensor, in particular a radio frequency identification (RFID) sensor, can also be used for this purpose.

In addition an odometric measurement for the spatial position determination is carried out via path sensors arranged at the wheels 5 or at the omni-drive modules 6. A safe signal which is defined by at least two independent channels according to different physical principles is generated from a combination of these three signals by the control unit 23.

In addition, fail-safe, multi-channel transducers are arranged at two respective oppositely disposed wheels 5 which detect the direction of rotation and the speed of rotation and thus allow a determination of a secure standing of the total apparatus.

Features of the different embodiment only disclosed in the embodiments can be combined with one another and claimed individually.

The invention claimed is:

1. An apparatus for the manipulation of articles comprising a multi-axial industrial robot arranged on a travel unit, the industrial robot and the travel unit being supplied with electrical energy via an energy storage unit, the travel unit having a control unit and at least three wheels having at least one drive unit, the control unit being configured to use the drive unit to rotate at least one of the wheels about an axis of rotation standing perpendicular to a symmetrical axis of rotation of the wheel and to rotate the wheel about the symmetrical axis of rotation by the respective drive unit so that the apparatus is travelable wirelessly in any direction by the travel unit, wherein a respective area monitoring sensor is arranged on at least two sides of the travel unit, each of the area monitoring sensors being configured to monitor a virtual surface located at a predefined spacing next to the travel unit and not intersecting the travel unit with respect to an intrusion of at least one of persons and articles, and also with respect to checking a floor for at least one of irregularities and obstacles, and wherein an area monitored by the area monitoring sensors ends at the floor and is adjustable to be inclined by up to 10° with respect to the symmetrical axis of rotation of the wheel.

2. The apparatus in accordance with claim 1, wherein a respective drive unit for rotation about the axis of rotation and about the symmetrical axis of rotation is arranged at each of the wheels.

3. The apparatus in accordance with claim 1, wherein the drive unit has a first motor for rotating the wheel about the symmetrical axis of rotation of the wheel and has a second motor for rotating the wheel about the axis of rotation.

4. The apparatus in accordance with claim 3, wherein at least one of the first motor and the second motor is an electric motor.

5. The apparatus in accordance with claim 1, wherein the area monitoring sensors are formed as laser scanners.

6. The apparatus in accordance with claim 1, wherein an identification unit for identifying at least one of the apparatus and further articles present in the surroundings of the apparatus is arranged at the travel unit.

7. The apparatus in accordance with claim 6, wherein the identification unit is formed as an electromagnetic sensor.

8. The apparatus in accordance with claim 7, wherein the identification unit is configured to recognize reference marks in a non-contact manner.

9. The apparatus in accordance with claim 1, wherein at least two space monitoring sensors are arranged at the travel unit which monitor a surface disposed in parallel to the floor on which the travel unit moves for obstacles.

10. The apparatus in accordance with claim 1, wherein at least two floor monitoring sensors are arranged at the travel unit which monitor a floor on which the travel unit moves by monitoring a floor contour with respect to obstacles or holes.

11. The apparatus in accordance with claim 10, wherein the at least two floor monitoring sensors are formed as laser distance sensors.

12. The apparatus in accordance with claim 1, wherein protective rails having a contact sensor are arranged on at least two sides of the travel unit.

13. The apparatus in accordance with claim 1, wherein the energy storage unit is arranged in a hermetically sealed housing.

* * * * *